US007139103B1

(12) United States Patent
Miyagi (10) Patent No.: US 7,139,103 B1
(45) Date of Patent: Nov. 21, 2006

(54) SCREENING METHOD AND A SCREENING APPARATUS

(75) Inventor: Makoto Miyagi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/471,287

(22) Filed: Dec. 23, 1999

(30) Foreign Application Priority Data

Dec. 28, 1998 (JP) .................................. 10-374074

(51) Int. Cl.
*H04N 1/405* (2006.01)
(52) U.S. Cl. ........................................ 358/3.2; 358/3.06
(58) Field of Classification Search ................. 358/1.9, 358/3.2, 3.06–3.12, 534–536, 3.27
See application file for complete search history.

(56) References Cited

U.S. PATENT DOCUMENTS

| | | | | |
|---|---|---|---|---|
| 5,588,094 A | * | 12/1996 | Kroon ........................ | 358/1.9 |
| 5,701,366 A | * | 12/1997 | Ostromoukhov et al. ... | 382/237 |
| 2002/0191203 A1 | * | 12/2002 | Miyagi ...................... | 358/1.9 |

FOREIGN PATENT DOCUMENTS

| JP | 02-281873 | 11/1990 |
|---|---|---|
| JP | 05-075223 | 3/1993 |
| JP | 07-264403 | 10/1995 |
| JP | 08-265568 | 10/1996 |
| JP | 10-290366 | 10/1998 |
| JP | 2001218053 A * | 8/2001 |

* cited by examiner

*Primary Examiner*—Thomas D. Lee
*Assistant Examiner*—Stephen Brinich
(74) *Attorney, Agent, or Firm*—Oblon, Spivak, McClelland, Maier & Neustadt, P.C.

(57) ABSTRACT

A screening method includes the steps of cutting off two corners facing each other of square cells to form non-regular hexagonal cells, combining plural of the hexagonal cells into one halftone cell. Further, an interior of the hexagonal cells can be divided in order to form sub-matrices. For a square matrix of 6×6 pixels, 2×2 pixels on the left-upper side of the square matrix of the 6×6 pixels and 2×2 pixels on the right-lower side thereof may be cut down, and thereby one hexagonal cell of 32 pixels not being of a regular hexagon is formed. Further, four hexagonal cells can be combined into one. In such a way, a complex hexagonal cell can be formed. Further, a hexagonal sub-matrix of 8 pixels, also not being of a regular hexagon, can be formed. The center cell of the hexagonal sub-matrix is set to an auxiliary point. Furthermore, three hexagonal cells can be combined into one halftone cell. The number of the halftones which can be expressed by such a halftone cell is 72.

18 Claims, 12 Drawing Sheets

|    |    |    |    | 69 | 30 | 48 | 60 | 63 |
|----|----|----|----|----|----|----|----|----|
| 70 | 31 | 40 | 52 | 64 | 57 | 24 | 3  | 15 | 27 |
| 61 | 22 | 4  | 25 | 28 | 45 | 9  | 0  | 6  | 39 |
| 49 | 10 | 1  | 7  | 43 | 33 | 18 | 12 | 21 | 51 |
| 34 | 19 | 13 | 16 | 55 | 66 | 54 | 42 | 36 |
| 67 | 58 | 46 | 37 | 71 | 32 | 44 | 56 | 65 |
|    |    |    |    | 53 | 20 | 5  | 23 | 29 |
|    |    |    |    | 41 | 11 | 2  | 8  | 47 |
|    |    |    |    | 35 | 26 | 14 | 17 | 59 |
|    |    |    |    | 68 | 62 | 50 | 38 |

CHANGE TO HEXAGON

FIG. 8C
BACKGROUND ART

HEXAGONAL CELL ON SQUARE GRID

FIG. 9B
BACKGROUND ART

ENLARGEMENT OF HEXAGONAL CELL

BACKGROUND ART

SHAPE OF HEXAGONAL CELL

FIG. 11
BACKGROUND ART

| 19 | 208 | 66 | 147 | 96 | 177 | 51 | 132 | 14 | 203 | 61 | 142 | 82 |
|---|---|---|---|---|---|---|---|---|---|---|---|---|
| 81 | 172 | 46 | 127 | 15 | 204 | 58 | 137 | 86 | 167 | 41 | 122 | 1 | 190 |
| 10 | 199 | 57 | 138 | 87 | 168 | 42 | 123 | 5 | 194 | 78 | 159 | 99 | 180 | 28 |
| 163 | 37 | 118 | 6 | 195 | 73 | 154 | 103 | 184 | 32 | 113 | 18 | 207 | 68 | 149 |
| 77 | 158 | 107 | 188 | 33 | 114 | 22 | 211 | 69 | 150 | 90 | 171 | 45 | 126 | 17 |
| 109 | 26 | 215 | 64 | 145 | 94 | 175 | 49 | 130 | 9 | 196 | 59 | 140 | 89 | 170 |
| 98 | 179 | 53 | 134 | 13 | 202 | 60 | 141 | 81 | 162 | 36 | 117 | 8 | 197 | 72 |
| 206 | 55 | 136 | 85 | 166 | 40 | 121 | 0 | 189 | 76 | 157 | 106 | 187 | 35 | 116 |
| 44 | 125 | 4 | 193 | 80 | 161 | 101 | 182 | 27 | 108 | 25 | 214 | 63 | 144 | 93 |
| 153 | 102 | 183 | 31 | 112 | 20 | 209 | 67 | 148 | 97 | 178 | 52 | 133 | 12 | 201 |
| 21 | 210 | 71 | 152 | 92 | 173 | 47 | 128 | 16 | 250 | 54 | 135 | 84 | 165 | 39 |
| 174 | 48 | 129 | 11 | 200 | 58 | 139 | 88 | 169 | 43 | 124 | 3 | 192 | 79 | 160 |
| 62 | 143 | 83 | 164 | 38 | 119 | 7 | 196 | 74 | 155 | 104 | 185 | 30 | 111 | 19 |
| 120 | 2 | 191 | 75 | 156 | 105 | 186 | 34 | 115 | 23 | 212 | 70 | 151 | 91 |
| 100 | 181 | 29 | 110 | 24 | 213 | 65 | 146 | 95 | 176 | 50 | 131 | 10 |

HEXAGONAL CELL :
  SETTING OF THRESHOLD VALUES

FIG. 12
BACKGROUND ART

DISTANCE BETWEEN DOTS ; LARGE

SCREENING METHOD AND A SCREENING APPARATUS

BACKGROUND OF THE INVENTION

1. Field of the Invention

The present invention relates to a screening method of and a screening apparatus for expressing a halftone by use of a halftone screen, and further relates to a screening method of and a screening apparatus for constructing a hexagonal cell on a square grid and suppressing the occurrence of a noise pattern in the horizontal direction and in the vertical direction.

2. Discussion of the Background

Generally, in an output device such as a printer with medium/low resolution, a halftone is not realized by a collective (concentrated) type dither nor is a halftone realized by a dispersion type random dither (error diffusion). Instead, in such a printer a halftone is typically realized by a dispersion type regular dither. The reasons for that are that, when the collective type dither is used, oozing-out or rosette due to ink closing-up together becomes prominent, and that, when the dispersion type random dither is used, memory requirements and calculation costs increase. Therefore, in particular, the technology of the dispersion type regular dither may become important in a color ink jet printer.

Generally, in the dispersion type regular dither screening, a square halftone cell is used. However, due to the property of the dither pattern, noise patterns easily recognizable by human eyes occur at some density. As a method of preventing the noise patterns from occurring in the horizontal and vertical directions, the document "Robert Ulichney. Digital Halftoning. The MIT Press" describes a regularly-hexagonal dither pattern. It has been thought that, according to the aforementioned dither, the dispersion type regular dither screening in which the above-mentioned patterns could be made not prominent.

However, since the hexagonal dither described in the aforementioned document is a symmetrical or regularly-hexagonal halftone cell realized on a 60-degree (60°) grid, an outputting device capable of marking dots on the 60° grid has to be prepared. Consequently, the above hexagonal dither cannot be applied to an outputting device for marking dots on a square grid.

In such a situation, since it is difficult to form a screen having a regularly-hexagonal cell which is spread all over the square grid, the present inventor has already proposed a method of expressing a hexagonal cell (not a regularly-hexagonal cell) having two sides (slanted sides) formed by removing a couple of corners from a square cell at positions opposing each other, and thereby suppressing the occurrence of the noise pattern in the horizontal and vertical directions as seen by the screening by use of the square halftone cell.

In such a situation, according to such a method of screening, it is necessary to arrange the cells such that the distance between the respective centers of adjacent cells is made as equal as possible in order to prevent the displacement of the pattern. As a result, the portion of the corner to be removed cannot be excessively large.

Figures 8A, 8B:
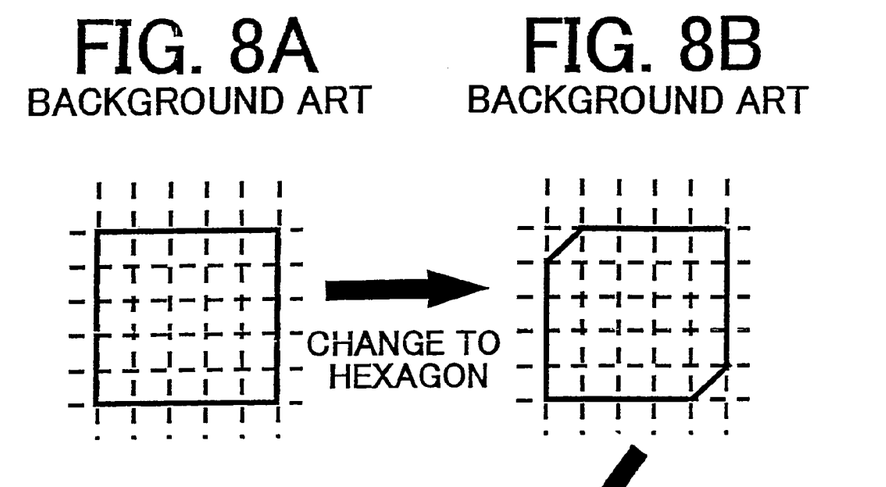
FIGS. 8A through 8C are explanatory diagrams illustrating a method of forming a hexagonal cell on a square grid according to background art.
Figure 8C:
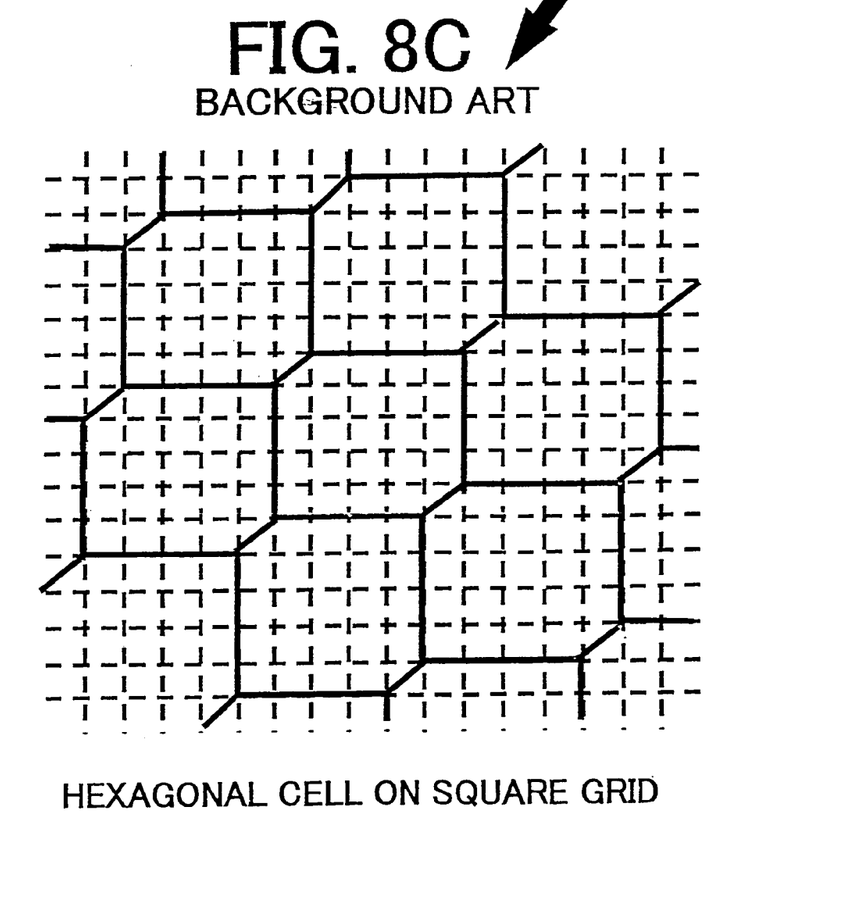

FIGS. 8A through 8C illustrate the case of forming a hexagonal cell on a 5×5 square grid as an example. On this occasion, the corners of two pieces of pixels in the 5×5 pixel opposing each other are removed as shown in the progression from FIGS. 8A to 8B. Thereby, a hexagonal cell of 24 (=5×5−1×1) pixels which is not regularly-hexagonal is formed as shown in FIG. 8B, and then, plural hexagonal cells thus formed are arranged on the square grid without any gaps therebetween as shown in FIG. 8C.

Figure 9A:
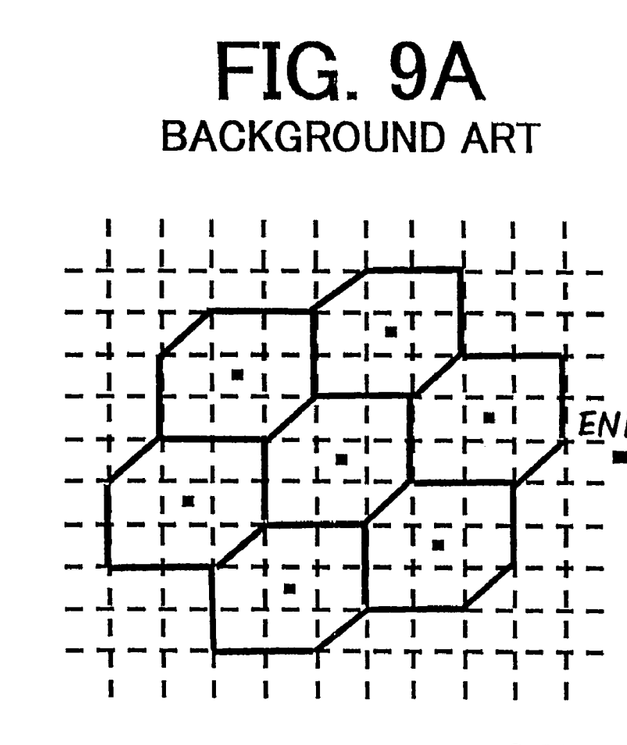
FIGS. 9A and 9B are explanatory diagrams illustrating a method of enlarging the hexagonal cell shown in FIGS. 8A through 8C.
Figure 9B:
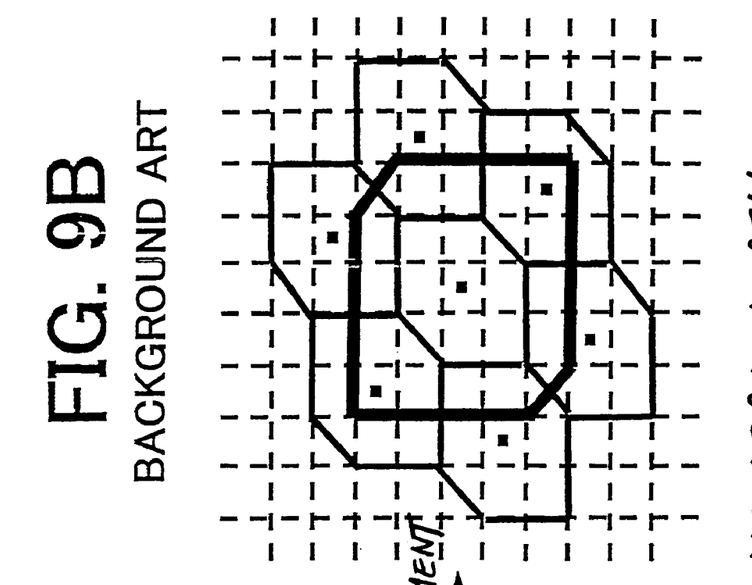
Figure 10:
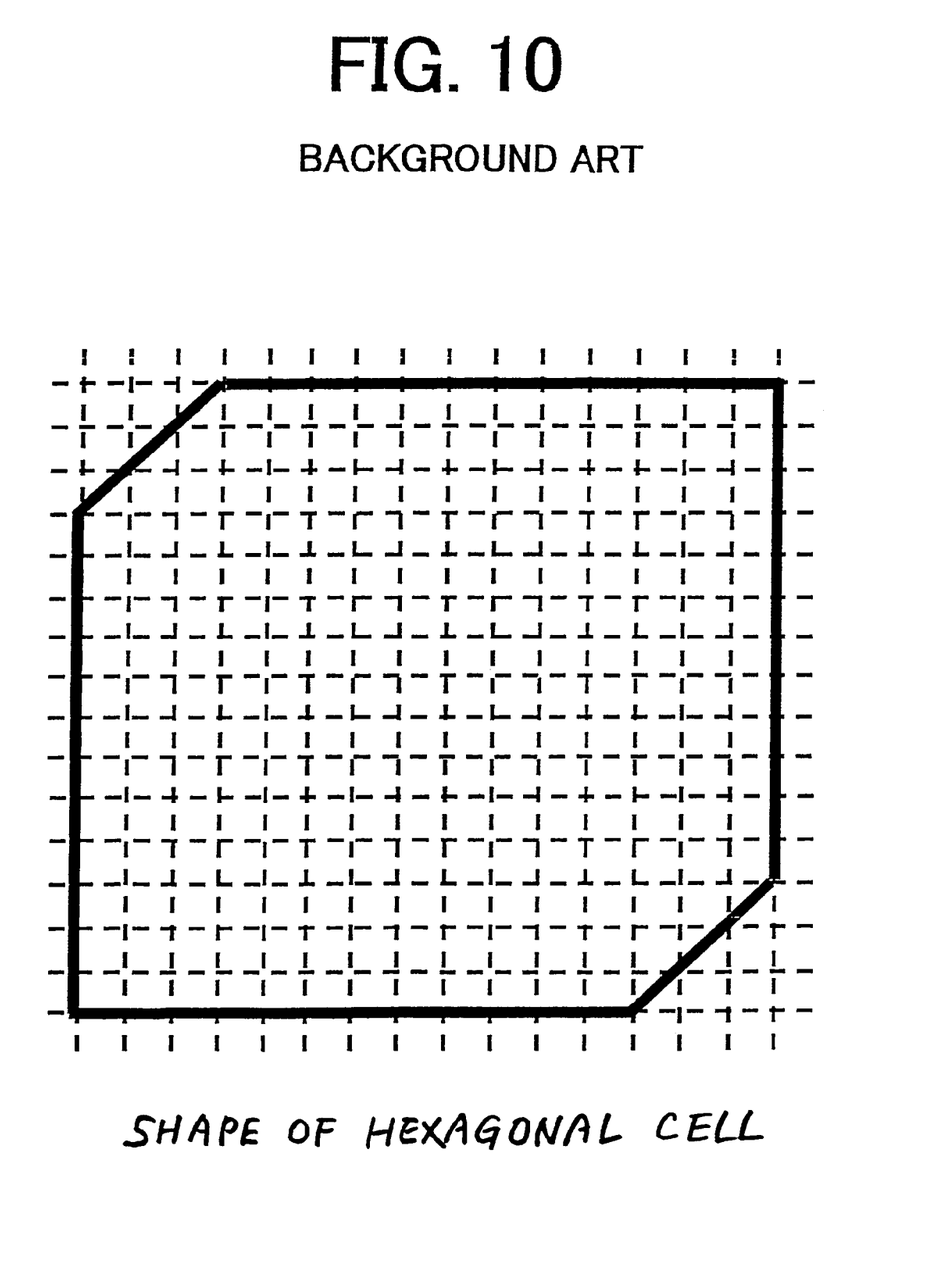
FIG. 10 is an explanatory diagram illustrating an enlarged hexagonal cell formed by enlarging the hexagonal cell shown in FIGS. 8A through 8C.
Figure 11:
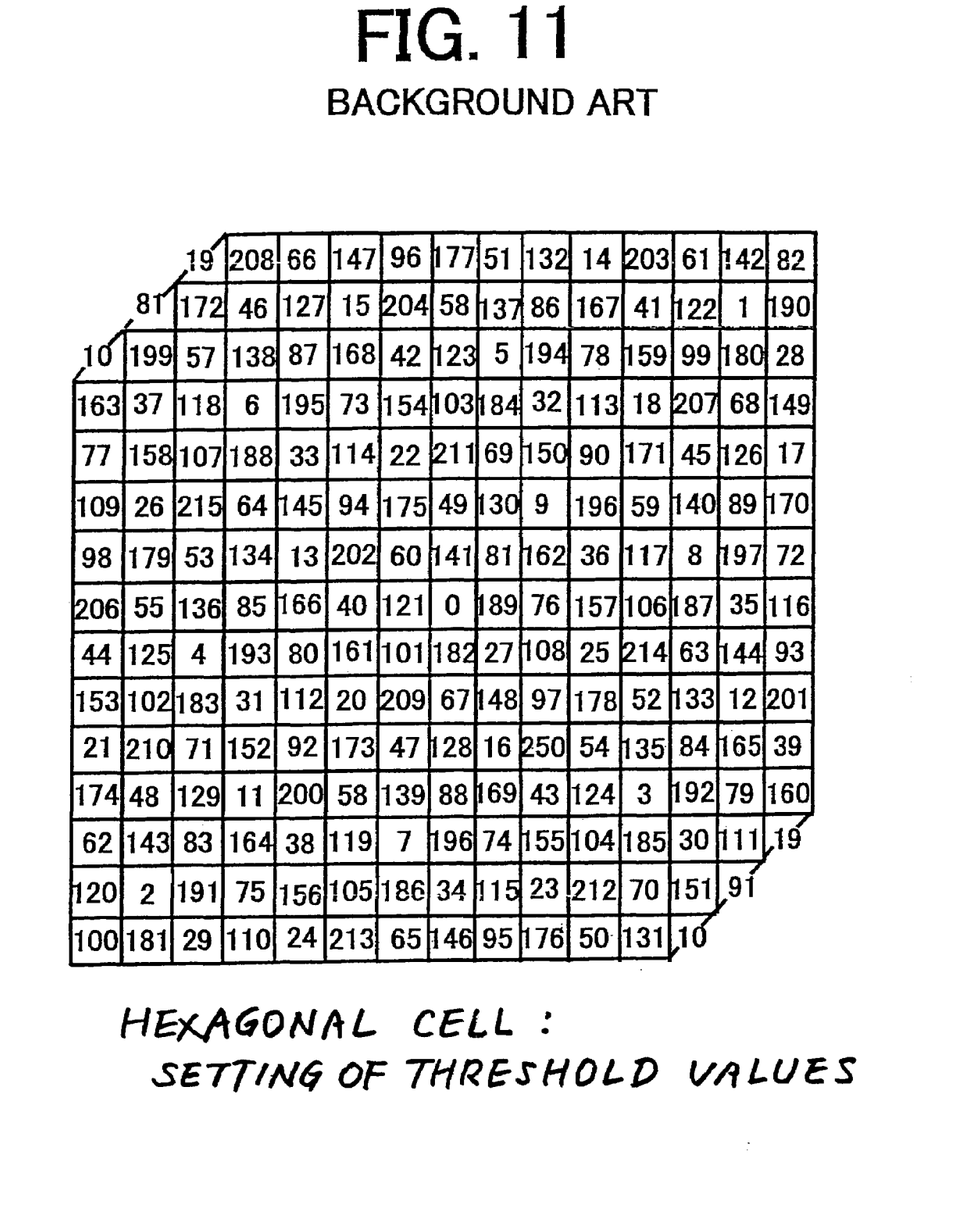
FIG. 11 is an explanatory diagram illustrating respective threshold values to be set in the hexagonal cell shown in FIG. 10.

Furthermore, FIGS. 9 through 11 illustrate a method of forming the hexagonal cells with the goal of expressing a halftone to the extent of a 256-step halftone. At first, since each cell requires pixels situated at the centers thereof, each fundamental hexagonal cell is firstly formed on a 3×3 square grid as shown in FIG. 9A. The above-mentioned hexagonal cell can express 8-step halftones (=3×3−1×1) as shown in FIG. 9A. Next, an enlargement is performed by forming a further large hexagonal cell on the condition that the center of the cells respectively adjacent to the sides of the fundamental hexagonal cell is an apex as shown in FIG. 9B.

On this occasion, it is preferable to cause the apex of the shape-angle portion to be included in the hexagonal cell and not to cause the apex of both ends of the slanted sides to be inclined therein. That is, the sharp-angle portion of the adjacent cell. By use of the hexagonal cell as shown in FIG. 9B, a 24-step halftone (=5×5−1×1) can be expressed. The same enlargement can be repeated for the cell thus enlarged, and thereby a hexagonal size cell capable of expressing a 72-step halftone (=9×9−3×3) can be formed. Furthermore, a hexagonal size cell capable of expressing a 216-step halftone (=15×15−3×3) can be formed as shown in FIG. 10. Next, threshold values are set for respective pixels as shown in FIG. 11.

Moreover, as an example of another background art, the published specification of Japanese Laid-open Patent Publication No. 8-265,568 describes a method of comparing one after another input image data with respective elements of a threshold value arrangement and converting the input image data to binarized or multiple-value data in a digital raster device. Then, in that method a smooth halftone equal to or greater than a 150-step halftone is realized by repeating a small pattern of 15-step halftones by use of a dither matrix composed of eight pieces of the raster capable of expressing a halftone equal to or greater than 15-step halftones. According to the method of the above-mentioned proposal of the background art, both of high resolution and low cost can be realized.

Moreover, as an example of still another background art, the published specification of Japanese Laid-open Patent Publication No. 7-264,403 describes a method of dividing a threshold value matrix into plural sub-matrices of sizes equal to each other, and randomly arranging the plural threshold values in the respective sub-matrices. According to the method of the above-mentioned proposal of the other background art, it is possible to make a threshold value matrix of high spatial frequency capable of expressing a smooth halftone.

The present inventor has also already proposed a screening method including the steps of cutting off a couple of corners facing each other of a square cell on a square grid and thereby forming hexagonal cells excluding a regularly-hexagonal cell, and combining plural of the hexagonal cells into one and thereby forming a halftone cell, in order to increase the number of expressive halftones without decreasing the number of lines.

Figure 12:
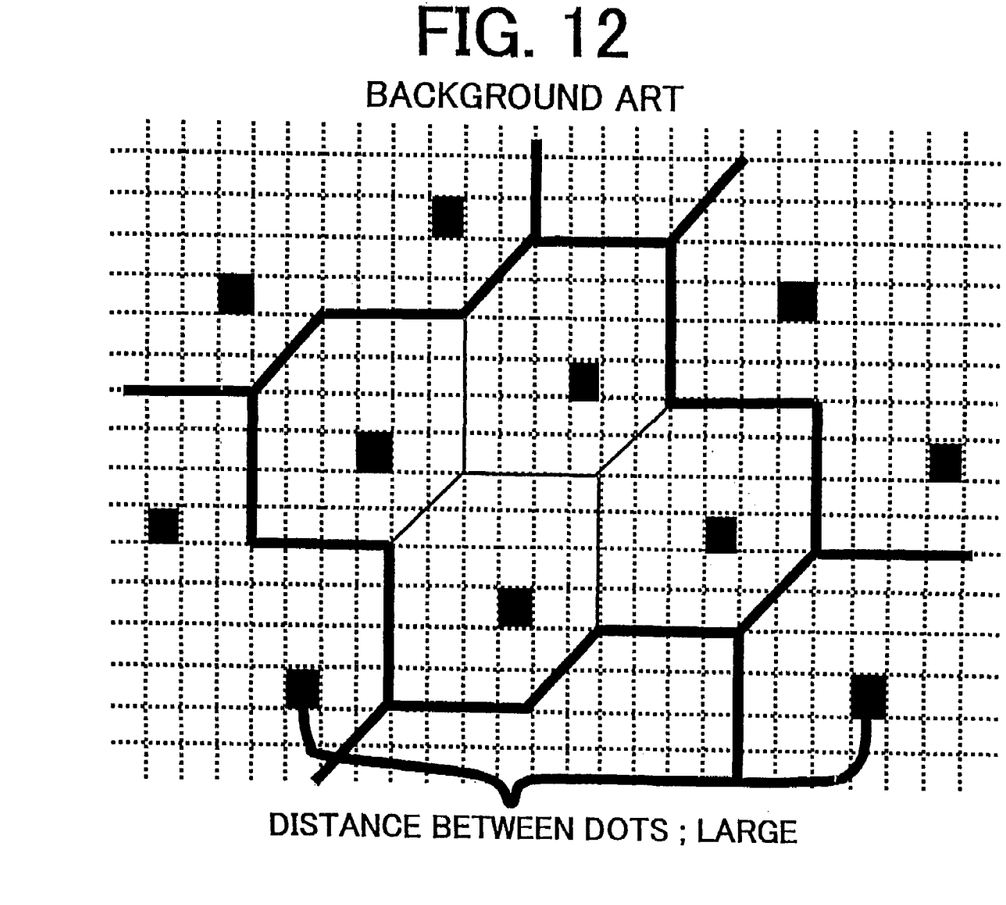
FIG. 12 is an explanatory diagram illustrating a screening method according to the background art.

In FIG. 12, as an example, for a square matrix of the 6×6 pixels, both of a left-upper half of the 2×2 pixels on the left-upper side of the square matrix of the 6×6 pixels and a right-lower half of the 2×2 pixels on the right-lower side thereof are cut down, and thereby one hexagonal cell of 32 (=6×6−2×2) pixels not being of a regular hexagon shape are formed, and four of the above-mentioned hexagonal cells are combined into one.

Concerning another background art of expressing halftones, for example as proposed in the published specification of Japanese Laid-open Patent Publication No. 8-265,568, a digital raster device compares, one after another, input image data with respective elements of a threshold values arrangement, and converts the respective input image data to data of binarized values or data of multiple values. In such a digital raster device, the dither matrix constructed with 8 pieces of raster capable of expressing a halftone property equal to or greater than 15 halftones is employed, and thereby a smooth halftone property equal to or greater than 150 halftones can be realized by repeating the small pattern of an extent of 15 halftones. According to the above proposed method, a high resolution of image forming and a low-cost image forming can be realized at the same time.

Furthermore, concerning still another background art of expressing halftones, for example as proposed in the published specification of Japanese Laid-open Patent Publication No. 7-264,403, a threshold values matrix is divided into plural sub-matrices of an equal size. In the respective sub-matrices, plural threshold values are randomly arranged, and thereby the spatial frequency can be made high. In addition, the threshold value matrix capable of smoothly expressing halftones can be formed.

Furthermore, concerning still another background art of expressing halftones, for example, the published specifications of Japanese Laid-open Patent Publication Nos. 7-38,755 and 7-290,737 propose similar technology.

SUMMARY OF THE INVENTION

Heretofore, background arts regarding the screening method have been described. However, according to such background arts which are disclosed in the background-art documents, e.g., the specifications of Japanese Laid-open Patent Publication Nos. 8-265,568, 7-264,403, 7-38,755, and 7-290,737, etc., there exists no advantageous functional effect for improving the screening method.

The present invention provides a novel technical method and apparatus of screening for expressing a halftone by use of a halftone screen, and for constructing a hexagonal cell on a square grid and suppressing the occurrence of a noise pattern in the horizontal direction and in the vertical direction. The present invention was made in order to solve and improve the problems of the aforementioned background arts.

To state an object of the present invention more concretely, according to the background-art method of expressing the hexagonal cell excluding the regularly-hexagonal cell on the square grid, when the hexagonal cell is determined in order with the shape such that the distance between the centers of the respective cells becomes as equal as possible, the number of the halftones which the cells can express becomes as follows in the order of the size of the cells from the smallest to the largest.

Number of the halftones equals:
  8 . . . in FIG. 9A;
  24 . . . in FIG. 9B;
  72 . . . in the Enlarged Cell of FIG. 9B; and
  216 . . . in FIGS. 10 and 11.

However, in order to use such halftones in a printer of medium/low halftones, since a practical cell from the viewpoint of the number of expressed halftones is, usually, a cell capable of expressing a 72-step halftone or more-step halftones, when the 72-step halftone cell is used for a 600 dpi printer, the extent of the halftones may become 60 lines, and thereby the quality of the output image may become further rough. That is a problem to be solved by the present invention.

In consideration of the problem of the background arts as mentioned heretofore, the present invention sets forth a novel screening method in which, when a hexagonal cell (excluding a regularly-hexagonal cell) formed on a square grid is applied to a printer of comparatively-low halftone number, the number of the lines capable of expressing the halftone is increased, and thereby the quality of the output image can be improved.

To state the problem of the background arts in another way, and with reference to FIG. 12, according to the background method which has been already proposed in relation to the screening method including the steps of cutting off a couple of corners facing each other of a square cell on a square grid, and thereby forming a hexagonal cell excluding a regularly-hexagonal cell, and combining plural halftone cells, paying attention to the dots employed for the circumferential part of the rectangular area parallel with the direction of the X-axis, the distance between the dots becomes large because of the sharp-angle dots arrangement.

For this reason, there occurs a phenomenon of blanking on a part where the distance between dots becomes wide. Furthermore, since the dots situated on the places neighboring the line connecting the other dots are not symmetrical to each other from the center between the other dots, if the dot is caused to grow as it is, there occurs a phenomenon of swelling and that is prominent and highlighted on a halftone image. The above-mentioned matters are further problems to be solved by the present invention.

The present invention has been made in order to solve the above-noted and other problems in consideration of the above-mentioned subject matters. The present invention solves the background-art defects such as the above-mentioned problems. The present invention provides a novel screening method capable of solving the background-art defects and thereby realizes an improved screening method. The present invention provides a novel screening method including the steps of cutting off two corners facing each other of a square cell on a square grid and thereby forming hexagonal cells excluding a regularly-hexagonal cell, and combining plural of the hexagonal cells into one, and thereby forming a halftone cell which can suppress swelling of an image when one part of the halftone cell is formed by combining plural of the hexagonal cells into one.

Other objects, features and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In describing the preferred embodiments of the present invention illustrated in the accompanying drawings, specific terminology is employed for the sake of clarity. However, the present invention is not intended to be limited to the specific terminology so selected and it is to be understood that each specific element includes all technical equivalents which operate in a similar manner.

In the present invention, in order to attain the objects of the present invention mentioned heretofore, a couple of corners, i.e. two corners, opposing each other of square cells on a square grid are removed, and thereby hexagonal cells excluding a regularly-hexagonal cell are formed, i.e., excluding a symmetrical hexagonal cell. A single halftone cell is formed by combining plural of the hexagonal cells into one. Threshold values are set to the respective grids of the halftone cell, and in such way a halftone can be expressed.

In the present invention, the plural halftone cells are arranged on the square grid without any gaps therebetween. The distance between the grids which start setting threshold values of adjacent halftones is made as equal as possible.

In the present invention, the threshold values to be set to the plural respective hexagonal cells for constructing the halftone cell are neither similar nor equal to each other.

Referring now to the drawings, and particularly FIGS. 4 through 7, there are illustrated exemplary screening methods according to the embodiments of the present invention. In order to attain the aforementioned objects of the present invention, a first aspect of the present invention is featured in a method of screening including the steps of cutting off a couple of corners facing each other of square cells on a square grid, and thereby forming non-symmetrical or non-regular hexagonal cells. Then, plural of the hexagonal cells are combined into one, and thereby a halftone cell is formed. Further, the interior of the hexagonal cell can be divided in order to form sub-matrices.

A second aspect of the present invention is featured in that, in the first aspect, each sub-matrix is employed for use in an auxiliary dot. A third aspect of the present invention is featured in that, in the first and second aspects, all of the sub-matrices in the hexagonal cell are not required to be of a same shape.

The preferred embodiments according to the present invention are concretely described hereinafter in more detail, referring to the accompanying drawings of FIGS. 1 through 7.

First Embodiment

Figure 1:
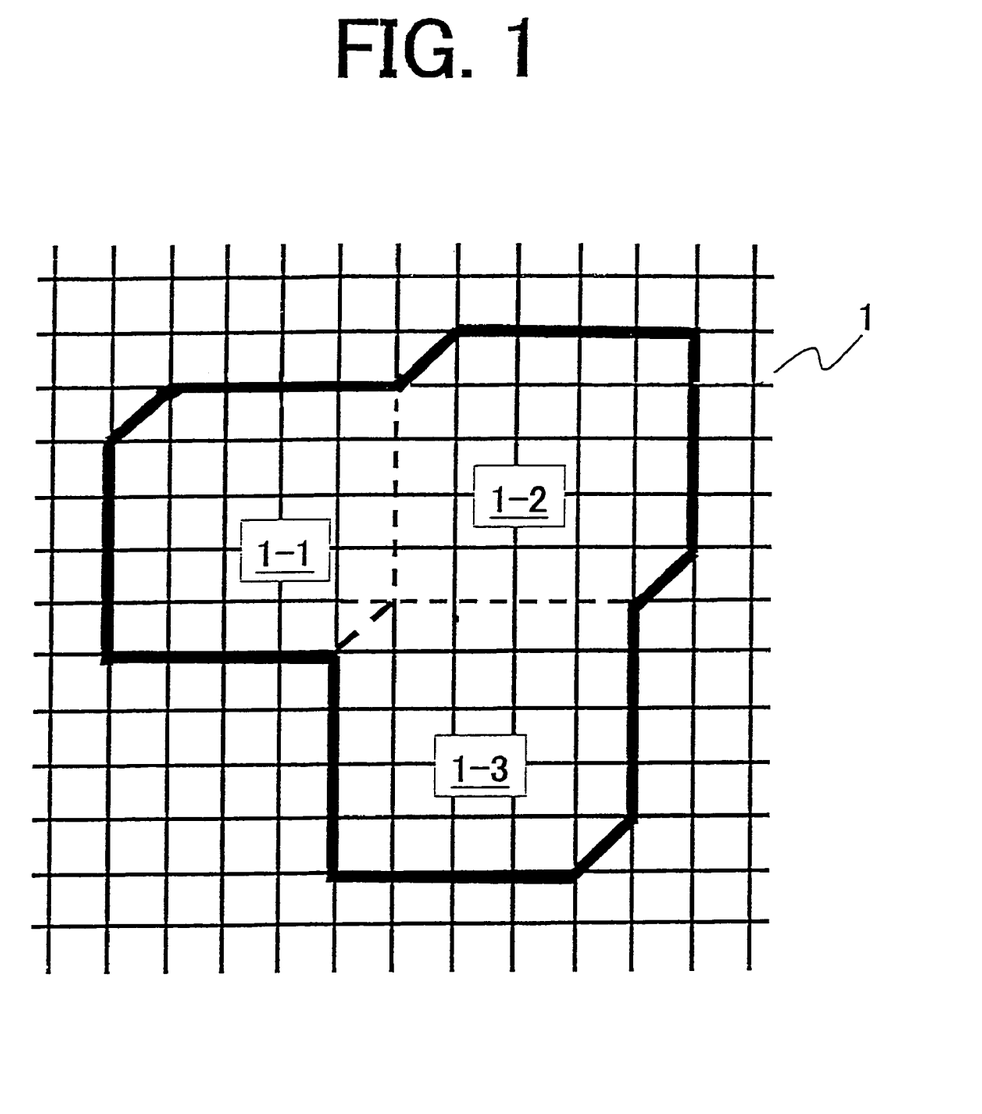
FIG. 1 is an explanatory diagram illustrating halftone cells in the screening method of a first embodiment according to the present invention.
Figure 2:
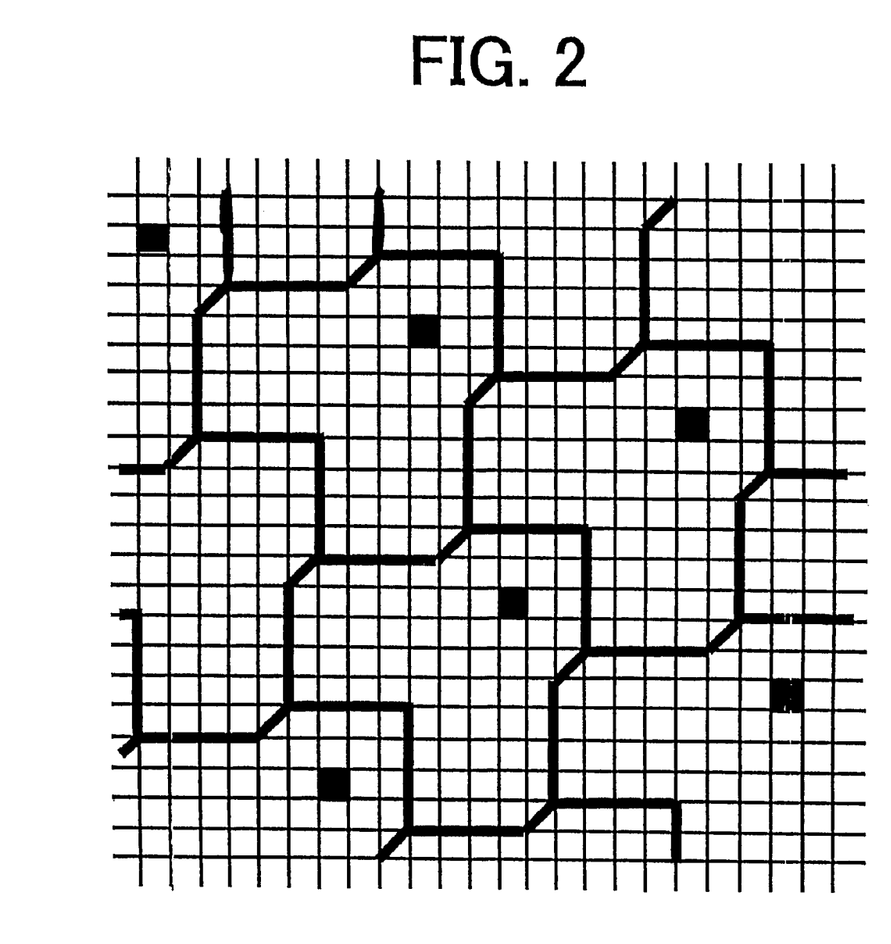
FIG. 2 is an explanatory diagram illustrating a state of arranging the halftone cells shown in FIG. 1 on a square grid.
Figure 3:
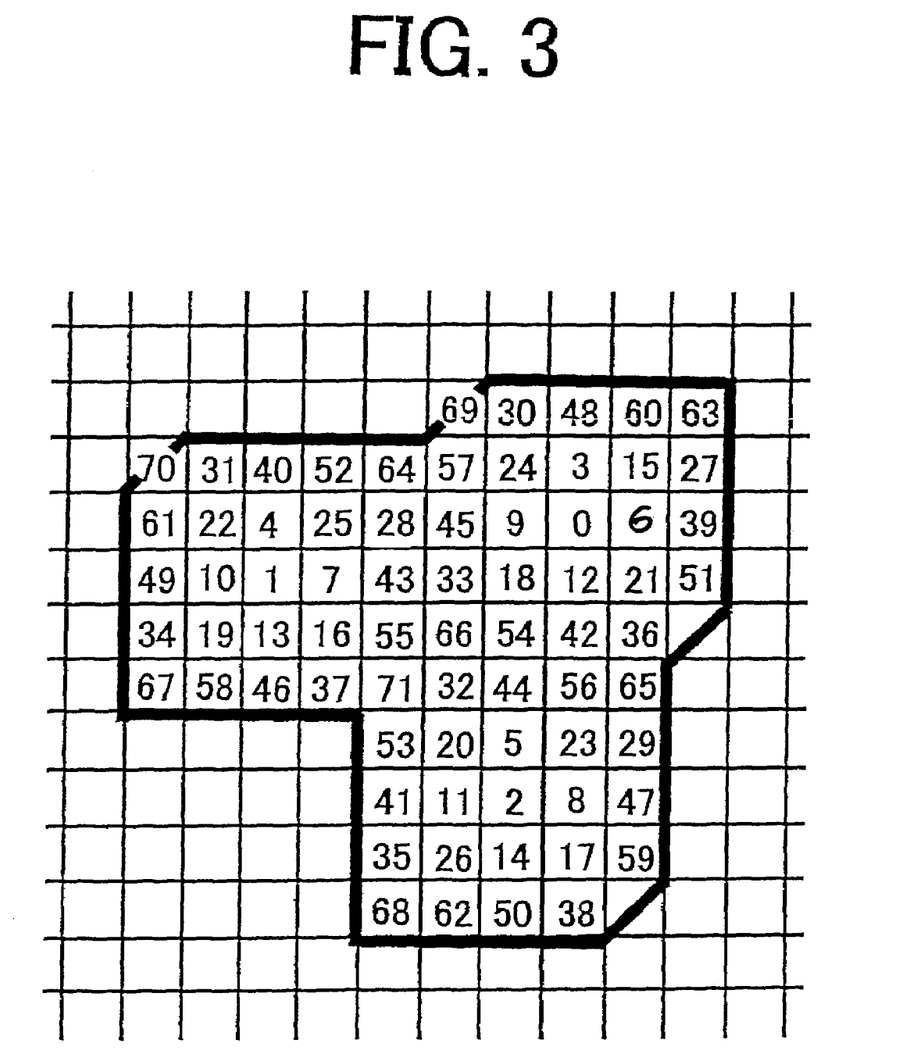
FIG. 3 is an explanatory diagram illustrating threshold values to be set in the halftone cells shown in FIG. 1.

A first embodiment of the present invention is described below. FIG. 1 is an explanatory diagram illustrating halftone cells in the first embodiment of the screening method according to the present invention. FIG. 2 is an explanatory diagram illustrating the state of arranging the halftone cells as shown in FIG. 1 on a square grid. FIG. 3 is an explanatory diagram illustrating threshold values to be respectively set in the halftone cells in FIG. 1.

At first, as shown in FIG. 1, a couple of corners opposing each other of the 5×5 square cell are both removed (i.e., cut off) therefrom in order to obtain two sides (i.e., the slanted sides), and thereby hexagonal cells 1-1, 1-2, and 1-3 each having 24 (=5×5−1×1) pixels can be formed. The three hexagonal cells 1-1, 1-2, and 1-3 thus formed are combined into one cell which forms halftone cell 1. Consequently, the number of the halftones capable of being expressed by the halftone cell 1 turns out to be 24×3=72. Moreover, since the size of one dot is almost 5×5, the total number of the halftones in the case of applying the halftones to a 600 dpi printer may become 600/5=120 from the relationship of:

Total Number=Resolution/Length of Cells on One Side.

Furthermore, as shown in FIG. 2, plural halftone cells 1 can be arranged on the screen grid without any gaps therebetween. At this time, the distance between the cells starting to set the threshold value of adjacent halftones can be made as equal as possible. In addition, the start pixels indicated in FIG. 2 by a black square in the respective halftone cells 1 are not intersected perpendicularly to each other in the horizontal direction and the vertical direction. Consequently, the occurrence of a noise pattern can be prevented both in the horizontal and vertical directions.

FIG. 3 illustrates an example of setting of threshold values for the respective pixel positions of the halftone cells 1. As is apparent from FIG. 3, the threshold values are set such that the order of painting out the respective pixels of the hexagonal cells 1-1, 1-2, and 1-3 constructing the halftone cells 1 does not resemble each other. Thereby, the occurrence of a periodical visible noise pattern can be prevented.

As is apparent from the foregoing description, in the first embodiment of the present invention, a hexagonal cell is formed, which is not a regular or symmetrical hexagonal cell, by cutting off two corners of square cells opposing each other on the square grid, and plural of the hexagonal cells are combined into one in order to form one halftone cell. By utilizing such a structure, in the case of applying the hexagonal cell (i.e., the not regularly-hexagonal cell) formed on the square grid to a printer of comparatively low halftone number, the number of lines capable of expressing the halftone can be increased, and thereby the quality of the output image can be improved.

In the first embodiment of the present invention, since the halftone cells are arranged on the square grid without forming any gaps therebetween, the operation of screening can be simply done. Furthermore, since the distance between the cells starting to set the threshold values of adjacent halftones are as equal as possible, the occurrence of a noise pattern can be prevented both in the horizontal and vertical directions.

In the first embodiment of the present invention, the threshold values to be set for the respective plural hexagonal cells constructing the halftone cell are not the same and do not resemble each other, and thus the occurrence of a periodical visible noise pattern can be prevented.

Second Embodiment

Figure 4:
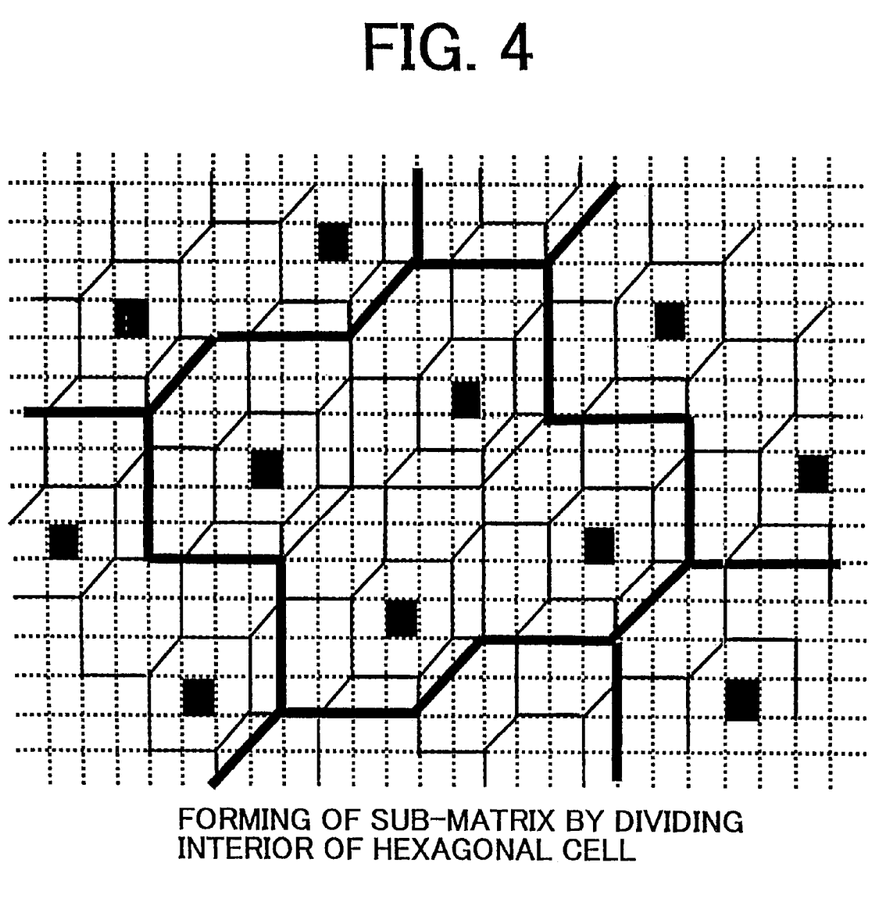
FIG. 4 is an explanatory diagram illustrating a first halftone expressing method utilizing a sub-matrix of a second embodiment in relation to the screening method according to the present invention.
Figure 5:
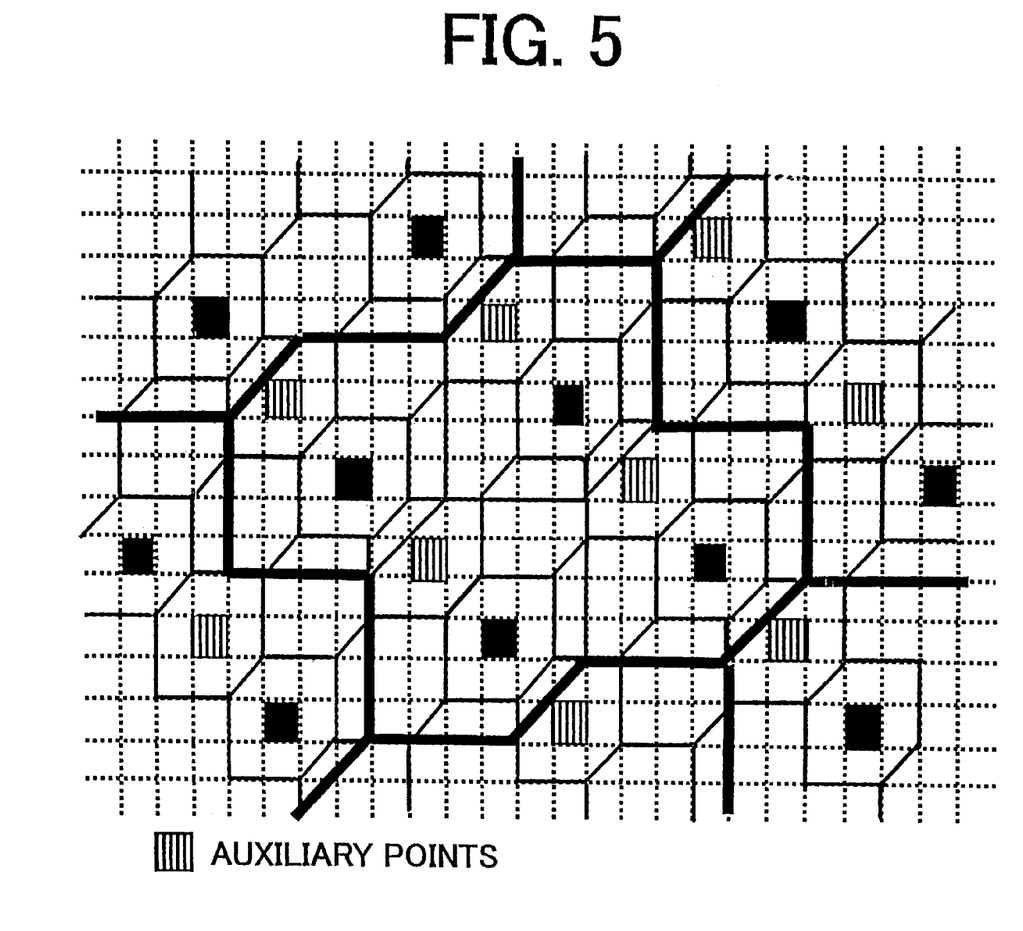
FIG. 5 is an explanatory diagram illustrating auxiliary points in the sub-matrices as illustrated in FIG. 1.

FIG. 4 is an explanatory diagram illustrating a first halftone expressing method utilizing a sub-matrix of the first embodiment in relation to the screening method according to the present invention, and FIG. 5 is an explanatory diagram for illustrating auxiliary points in the sub-matrix as illustrated in FIG. 4.

Here, as described in the above "Discussion of the Background" section, paying attention to the dots employed for image-drawing the circumferential part of the rectangular area parallel with the direction of the x-axis, the distance between the dots becomes large because of the sharp-angle dots arrangement.

For this reason, a phenomenon of blanking on an area where the dots distance becomes wide may occur. Furthermore, since the dots situated on the places neighboring the line connecting the other dots are not symmetrical to each other from the center between the other dots, if the dot is caused to grow as it is, a phenomenon of swelling may occur, and that is prominent or highlighted on a halftone image. The above-mentioned matters are further problems to be solved by the present invention.

Here, in order to prevent such problems, there are some methods of arranging the dots with an adequate angle and/or by reducing the distance between the dots or making the cell itself small.

On the other hand, according to the present invention, sub-matrices can be formed by dividing each hexagonal cell in the complex hexagonal cell as shown in FIG. 4. Furthermore, the auxiliary points (i.e., auxiliary dots) are provided in order to reduce and make the distance between the dots smaller as shown in FIG. 5.

To state the further structure in more detail, at first, as shown in FIG. 4, for a square matrix of 6×6 pixels, both of a left-upper half of the 2×2 pixels on the left-upper side of the square matrix of the 6×6 pixels and a right-lower half of the 2×2 pixels on the right-lower side thereof are cut down, and thereby one hexagonal cell of 32 (=6×6−2×2) pixels not of a regular hexagon is formed, and four of the above-mentioned hexagonal cells are combined into one. In such way, a complex hexagonal cell can be formed, and then, in the respective hexagonal cells, for a square matrix of the 3×3 pixels, both of a left-upper half of one pixel on the left-upper side of the square matrix of the 3×3 pixel and a right-lower half of one pixel on the right-lower side thereof are cut down, and thereby one hexagonal sub-matrix of 8 (=3×3−1) pixels not of a regular hexagon is formed. Furthermore, as shown in FIG. 5, if the central cell of each hexagonal sub-matrix is set as the auxiliary point, the distance between the dots becomes small. For this reason, a blanking portion causing a swelling phenomenon can be buried, and thereby swelling of the image can be suppressed.

According to the above-mentioned screening method, as the first method of expressing the halftone, the cell in the sub-matrix where no auxiliary dot is provided therein is painted out firstly in order to cause the hexagonal cell to grow. After painting out all of the cells of the above-mentioned sub-matrix, the cells of the sub-matrix where the auxiliary dot is provided therein is painted out secondly.

Third Embodiment

Figure 6:
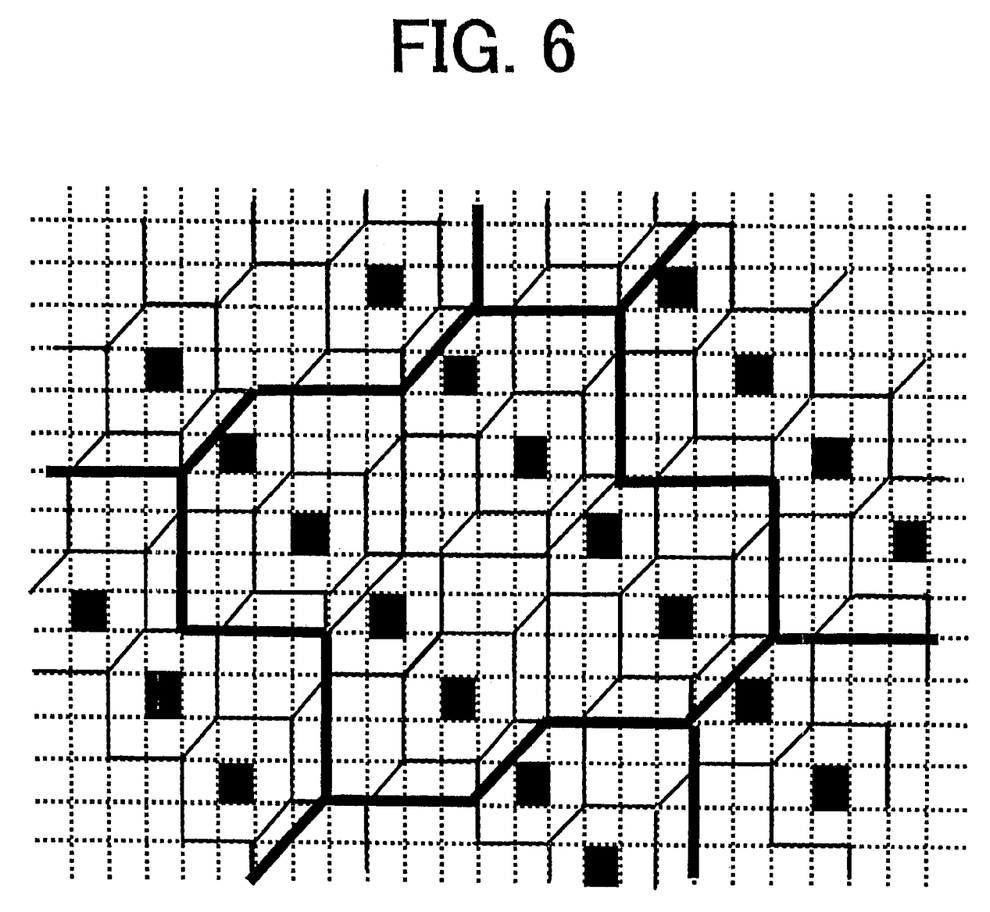
FIG. 6 is an explanatory diagram illustrating a second halftone expressing method utilizing the sub-matrix as illustrated in FIGS. 1 and 2 of a third embodiment in relation to the screening method according to the present invention.

On the other hand, as a second method of expressing a halftone as shown in FIG. 6, if the auxiliary dot is caused to grow by treating the dot in the same way as that of the essential dot, the number of lines can be increased without decreasing the number of the halftones. However, on this occasion, since the distance between the dots decreases, the combining due to the dot gain tends to easily occur.

The first and second methods of expressing the halftone are described above. However, it may be preferable to adopt either one of the above two methods in accordance with the shape and size of the sub-matrices.

Here, it is not necessary that all of the sub-matrices in the hexagonal cell are of the same shape. Furthermore, it is also not necessary that all of the above sub-matrices are hexagonal.

Fourth Embodiment

Figure 7:
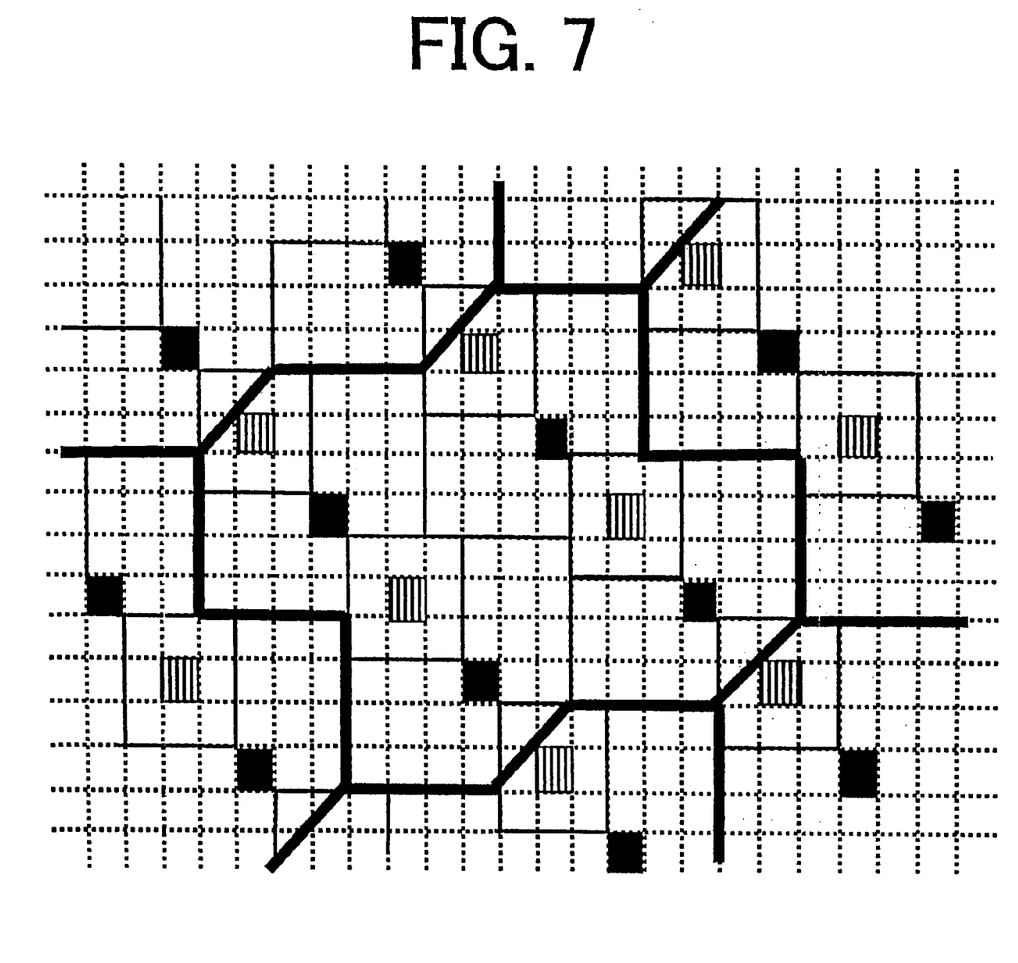
FIG. 7 is an explanatory diagram illustrating a third halftone expressing method utilizing the sub-matrix as illustrated in FIGS. 1 and 2 having another shape of a fourth embodiment in relation to the screening method according to the present invention.

FIG. 7 is an explanatory diagram for illustrating a third halftone expressing method utilizing the sub-matrix method as illustrated in FIGS. 4 and 5 having another shape of the third embodiment in relation to the screening method according to the present invention.

In FIG. 7, as an example, in the complex hexagonal cell formed by combining four hexagonal cells into one, the left-upper oblique side part is formed as a 8-pixels pentagonal sub-matrix, the right-lower oblique side part is formed as a 2-pixels triangular sub-matrix, and the other parts are respectively formed as a 3×4 pixels rectangular sub-matrix, a 4×3 pixels rectangular sub-matrix, and a 3×3 pixels square sub-matrix.

As is apparent from the foregoing description, according to the fourth embodiment of the present invention, a couple of corners facing each other of a square cell on a square grid are cut off, and thereby non-regular hexagonal cells, i.e. excluding a regularly-hexagonal cell, are formed, plural hexagonal cells are combined into one, and thereby a halftone cell is formed, and the interior of the combined hexagonal cell is divided in order to form sub-matrices. By adopting such a structure, the swelling of the image can be considerably suppressed.

According to the fourth embodiment of the present invention, since a sub-matrix is employed for use in the auxiliary dot, the swelling of the image can be also considerably suppressed.

According to the fourth embodiment of the present invention, since all of the sub-matrices in the hexagonal cell are not required to be of the same shape, the shape of the dot can be set with wide variation.

The first through fourth embodiments of the present invention have been described heretofore. However, obviously, numerous other embodiments or numerous modifications or variations of the present invention are possible in light of the above teachings. It is therefore to be understood that, within the scope of the appended claims, the present invention may be practiced otherwise than as specifically described herein.

Having now fully described the invention, it will be apparent to one of ordinary skill in the art that many changes and modifications can be made thereto without departing from the spirit and scope of the invention as set forth herein.

This document is based on Japanese Patent Application No. JPAP 10-374,074, filed on Dec. 28, 1998, the entire contents of which are hereby incorporated herein by reference.

The invention claimed is:

1. A screening method comprising the steps of:
cutting off two corners facing each other of square cells on a square grid to form non-regular hexagonal cells;
combining plural of said hexagonal cells into one combined single halftone cell;
setting threshold values for respective grids of said single halftone cell to express a halftone; and
wherein in said setting step the set threshold values for each of said respective plural hexagonal cells constructing said single halftone cell are not the same.

2. A screening method comprising the steps of:
cutting off two corners facing each other of square cells on a square grid to form non-regular hexagonal cells;
combining plural of said hexagonal cells into a combined single halftone cell;
setting respective different threshold values for respective grids of said single halftone cell to express a halftone; and
wherein in the setting step the set threshold values for each of said respective plural hexagonal cells constructing said single halftone cell are not the same.

3. A screening method comprising the steps of:
cutting off two corners facing each other of square cells on a square grid to form non-regular hexagonal cells;
combining plural of said hexagonal cells into a combined single halftone cell; and
dividing an interior of each of said respective hexagonal cells to form respective sub-matrices.

4. A screening method as defined in claim 3, wherein in said dividing step each sub-matrix is employed for an auxiliary dot.

5. A screening method as defined in claim 3, wherein said sub-matrices in said hexagonal cells are not all of a same shape.

6. A screening method as defined in claim 4, wherein said sub-matrices in said hexagonal cells are not all of a same shape.

7. A screening apparatus comprising:
hexagonal cell forming means for cutting off two corners facing each other of square cells on a square grid to form non-regular hexagonal cells;
halftone cell forming means for combining plural of said hexagonal cells into a combined single halftone cell; and
threshold value setting means for setting threshold values for respective grids of said single halftone cell to express a halftone; and
wherein in the threshold value setting means the set threshold values for each of said respective plural hexagonal cells constructing said single halftone cell are not the same.

8. A screening apparatus comprising:
hexagonal cell forming means for cutting off two corners facing each other of square cells on a square grid to form non-regular hexagonal cells;
halftone cell forming means for combining plural of said hexagonal cells into a combined single halftone cell; and
threshold values setting means for setting respective different threshold values to the respective grids of said single halftone cell to express a halftone; and
wherein in the threshold value setting means the set threshold values for each of said respective plural hexagonal cells constructing said single halftone cell are not the same.

9. A screening apparatus comprising:
hexagonal cell forming means for cutting off two corners facing each other of square cells on a square grid to form non-regular hexagonal cells;
halftone cell forming means for combining plural of said hexagonal cells into a combined single halftone cell; and
sub-matrix forming means for dividing an interior of each of said respective hexagonal cells to form sub-matrices.

10. A screening apparatus as defined in claim 9, wherein each sub-matrix is employed for an auxiliary dot.

11. A screening apparatus as defined in claim 9, wherein said sub-matrices in said hexagonal cells are not all of a same shape.

12. A screening apparatus as defined in claim 10, wherein said sub-matrices in said hexagonal cells are not all of a same shape.

13. A screening method comprising the steps of:
cutting off two corners facing each other of square cells on a square grid to form non-regular hexagonal cells;
combining plural of said hexagonal cells into one combined single halftone cell;
setting threshold values for respective grids of said single halftone cell to express a halftone;
combining plural single halftone cells arranged on said square grid without any gaps therebetween; and
wherein respective threshold value setting start pixels in adjacent halftone cells are not aligned in either horizontal or vertical directions.

14. A screening method as defined in claim 13, wherein in said setting step the set threshold values for each of said respective plural hexagonal cells constructing said single halftone cell are not the same.

15. A screening method comprising the steps of:
cutting off two corners facing each other of square cells on a square grid to form non-regular hexagonal cells;
combining plural of said hexagonal cells into a combined single halftone cell;
setting respective different threshold values for respective grids of said single halftone cell to express a halftone;
combining plural single halftone cells arranged on said square grid without any gaps therebetween; and
wherein respective threshold value setting start pixels in adjacent halftone cells are not aligned in either horizontal or vertical directions.

16. A screening apparatus comprising:
hexagonal cell forming means for cutting off two corners facing each other of square cells on a square grid to form non-regular hexagonal cells;
halftone cell forming means for combining plural of said hexagonal cells into a combined single halftone cell;
threshold value setting means for setting threshold values for respective grids of said single halftone cell to express a halftone;
means for combining plural of said halftone cells arranged on said square grid without any gaps therebetween; and wherein respective threshold value setting start pixels in adjacent halftone cells are not aligned in either horizontal or vertical directions.

17. A screening apparatus as defined in claim 16,
wherein in the threshold value setting means the set threshold values for each of said respective plural hexagonal cells constructing said single halftone cell are not the same.

18. A screening apparatus comprising:

hexagonal cell forming means for cutting off two corners facing each other of square cells on a square grid to form non-regular hexagonal cells;

halftone cell forming means for combining plural of said hexagonal cells into a combined single halftone cell;

threshold values setting means for setting respective different threshold values to the respective grids of said single halftone cell to express a halftone;

means for combing plural of said halftone cells arranged on said square grid without any gaps therebetween; and wherein respective threshold value setting start pixels in adjacent halftone cells are not aligned in either horizontal or vertical directions.

* * * * *